United States Patent [19]

Tajima et al.

[11] Patent Number: 4,913,521
[45] Date of Patent: Apr. 3, 1990

[54] SINGLE-POLARIZATION OPTICAL FIBER

[75] Inventors: Katsusuke Tajima, Katsuta; Yutaka Sasaki; Masaharu Ohashi; Makoto Tsubokawa; Nobuo Kuwaki, all of Mito, Japan

[73] Assignee: Nippon Telegraph and Telephone Corporation, Tokyo, Japan

[21] Appl. No.: 279,022

[22] Filed: Dec. 2, 1988

[30] Foreign Application Priority Data

Dec. 4, 1987 [JP] Japan .................... 62-305751
Nov. 16, 1988 [JP] Japan .................... 63-287568

[51] Int. Cl.⁴ .............................. G02B 6/22
[52] U.S. Cl. .................................. 350/96.33
[58] Field of Search ............ 350/96.33, 96.34, 96.29

[56] References Cited

U.S. PATENT DOCUMENTS

| | | | |
|---|---|---|---|
| 4,415,230 | 11/1989 | Keck | 350/96.33 |
| 4,478,489 | 10/1984 | Blankenship et al. | 350/96.33 X |
| 4,480,897 | 11/1984 | Okamoto et al. | 350/96.33 X |
| 4,493,530 | 1/1985 | Kajioka et al. | 350/96.33 X |
| 4,515,436 | 5/1985 | Howard et al. | 350/46.33 |
| 4,529,426 | 7/1985 | Pleibel et al. | 65/3.11 |
| 4,610,506 | 9/1986 | Tokunaga et al. | 350/96.33 |
| 4,664,473 | 5/1987 | Gannon | 350/96.33 |

FOREIGN PATENT DOCUMENTS 61185703 8/1986 Japan .
61200509 9/1986 Japan .

OTHER PUBLICATIONS

K. Okamoto et al., "Stress Analysis of Optical Fibers by a Finite Element Method", IEEE JOURNAL OF QUANTUM ELECTRONICS, vol. QE-17, No. 10, Oct., 1981, pp. 2123-2129.

K. Okamoto, "Single-Polarization Operation in Highly Birefringent Optical Fibers", APPLIED OPTICS, vol. 23, No. 15, Aug. 1, 1984, pp. 2638-2642.

Eikichi Yamashita et al., "Modal Analysis of Homogeneous Optical Fibers with Deformed Boundaries", IEEE Transactions on Microwave Theory and Techniques, vol. MIT-27, No. 4, April, 1979, pp. 352-356.

J. R. Simpson et al., "A Single-Polarization Fiber", JOURNAL OF LIGHTWAVE TECHNOLOGY, vol. LT-1, No. 2, June, 1983, pp. 370-374.

Roger Stolen et al, "High-Birefringence Optical Fibers by Preform Deformation", JOURNAL OF LIGHTWAVE TECHNOLOGY, vol. LT-2, No. 5, Oct., 1984, pp. 639-641.

Primary Examiner—John D. Lee
Assistant Examiner—Phan T. Heartney
Attorney, Agent, or Firm—Spencer & Frank

[57] ABSTRACT

A single-polarization optical fiber comprising a core, an inner cladding surrounding the core, an outer cladding surrounding the inner cladding and at least one pair of stress-applying portions each of which are partially extended into both the inner and outer claddings and which are symmetrical about the axis of the core and having thermal expansion coefficient higher than those of both the inner and outer claddings. When the refractive index of the stress-applying portions is lower than that of the core and higher than that of the inner cladding and further not higher than that of the outer cladding, one of orthogonally polarized mode is cutoff and only one polarized mode can propagate in the optical fiber.

13 Claims, 17 Drawing Sheets

SINGLE-POLARIZATION OPTICAL FIBER

BACKGROUND OF THE INVENTION

1. FIELD OF THE INVENTION

The present invention relates to a single-polarization optical fiber (absolute single-polarization optical fiber) which is required as a transmission medium in the coherent light transmission system, a transmission medium for the ultra-high-speed transmission system or a coupler between optical circuit elements with the polarization characteristic so that only one polarization can be propagated and more particularly a single-polarization optical fiber which persists to propagate only one of two orthogonally polarized polarizations while suppressing the other polarization by increasing its transmission loss.

2. DESCRIPTION OF THE PRIOR ART

Single-polarization optical fibers so far proposed have the cross sectional constructions as shown in FIGS. 1 and 3A, respectively. The construction as shown in FIG. 1 is disclosed in "A Single-Polarization Fiber", J. R. Simpson et al., IEEE Lightwave Technology, LT-1, No. 2, pp. 370-374, 1983, "High-Birefringence Optical Fibers by Preform Deformation", R. H Stolen et al., ibid., LT-2, No. 5, pp. 639-641, 1984, and U.S. Pat. Nos. 4,515,436 and 4,529,426. That is, in the case of the single-polarization optical fiber shown in FIG. 1, an inner elliptical cladding 2 is disposed to surround a core 1 and an outer elliptical cladding 3 is disposed to surround both the core 1 and the inner cladding 2. However, such optical fiber is not circular in cross section so that when it is welded to a single-mode optical fiber circular in cross section, its rectangular cross section becomes again a circular cross section and consequently the elliptical cross section of the inner cladding 2 also becomes almost a circular cross section whereby the birefringence is decreased. When one polarization is guided into the optical fiber, the other polarization component is generated during the propagation. The ratio in power between such two polarizations is called "crosstalk" and the lesser the crosstalk, the higher the characteristic become. A degree of crosstalk is increased with increase of the ellipticity of the inner cladding 2. In the case of the fabrication of the conventional single-polarization optical fiber of the type shown in FIG. 1, as shown in FIG. 2, a preform comprising a core 1A, an inner cladding 2A and an outer cladding 3A is heated and squeezed from both sides by squeezing members W. The preform thus flattened is further drawn into an optical fiber so that the probability that the cross section of the inner cladding is reproduced as desired is low and furthermore the shape in the longitudinal direction of the preform is varied. As a result, it is difficult to attain a low loss and a low crosstalk as well throughout a long optical fiber line.

FIG. 3A shows a cross section of another conventional single-polarization optical fiber disclosed in Japanese Patent Application Laid-Open Nos. 61-200,509 and 61-185,703. Neither of such patent applications discloses the refractive index of the stress-applying portion. FIGS. 3B and 3C illustrate the refractive index profiles in the x- and y-directions which are estimated from the whole description of the above-mentioned patent applications.

The single-polarization optical fiber shown in FIG. 3A is a double-cladding type single-mode optical fiber which includes of a core 1, an inner cladding 4 and an outer cladding 5 and has the W-type refractive index profile and in which stress-applying portions 6 which have a thermal expansion coefficient higher than those of the inner and outer claddings 4 and 5 are added on the x-axis so that a stress is applied to the core 1 in x-direction and hence the core 1 has a high birefringence, whereby one of $HE_{11}^x$ mode (x-polarization) and $HE_{11}^y$ mode (y-polarization) is cutoff while the other is permitted to propagate through the optical fiber. However, in this construction, only the stress distribution is taken into consideration and the anisotropy of the refractive index distribution is not taken account. With above-described construction, one mode is cutoff by the outer cladding so that the outer cladding must be arranged considerably closely to the core. As a result, an almost all the portion of each stress-applying portion must be located within the outer cladding. When the refractive index $n_3$ of the stress-applying portions is higher than the refractive index $n_2$ of the outer cladding, light is confined in the stress-applying portions and therefore the transmission characteristics are adversely affected. It follows, therefore, that the refractive index $n_3$ of the stress-applying portions must be made equal to or lower than the refractive index $n_2$ of the outer cladding. When the refractive index of the stress-applying portions is equal to that of the outer cladding, the effect of the refractive index of the stress-applying portions is masked by the refractive index of the outer cladding so that the birefringence due to the anisotropy of the refractive index distribution (geometical birefringence) is considerably decreased. On the other hand, when the refractive index $n_3$ of the stress-applying portions is made lower than the refractive index $n_2$ of the outer cladding, the birefringence due to stresses (stress-induced birefringence) and the geometrical birefringence are cancelled by each other so that the total birefringence which represents the sum of the birefringence due to stresses and the birefringence due to the geometrical shape becomes lower than the birefringence only due to the existence of stresses.

As described above, in the cases of the conventional single-polarization optical fibers, it is difficult to decrease losses and crosstalk and there exists a defect that the single-polarization wavelength band is narrow.

SUMMARY OF THE INVENTION

In view of the above, therefore, it is an object of the present invention to provide a single-polarization optical fiber having a high matching characteristic with conventional single-mode optical fibers.

It is another object of the present invention to provide a single-polarization optical fiber having a low loss and a wide single-polarization wavelength band.

It is a further object of the present invention to provide a single-polarization optical fiber in which Brillouin scattering light can be suppressed.

It is a still further object of the present invention to provide a single-polarization optical fiber suitable for 1.55 μm optical transmission.

In order to achieve the above objects, a single-polarization optical fiber comprises:

a core;

an inner cladding surrounding the core;

an outer cladding surrounding the inner cladding;

at least one pair of stress-applying portions each of which are partially extended into both the inner and outer claddings and which are symmetrical about the axis of the core, the thermal expansion coefficient of the stress-applying portions is higher than those of the inner and outer claddings; and when the direction in which the stress-applying portions impart stresses is designated by the x-direction and the direction perpendicular to the x-direction is designated by the y-direction, the following conditions being satisfied:

$$n_{1x} < n_{3x} < n_{cx},$$

$$n_{3x} \leqq n_{2x},$$

$$n_{1y} < n_{3y} \text{ and}$$

$$n_{3y} \leqq n_{2y}$$

where $n_{cx}$, $n_{1x}$, $n_{2x}$ and $n_{3x}$ are refractive indices for x-polarization of the core, the inner cladding, the outer cladding and the stress-applying portions, respectively, and $n_{cy}$, $n_{1y}$, $n_{2y}$ and $n_{3y}$ are refractive indices for y-polarization of the core, the inner cladding, the outer cladding and the stress-applying portions.

Here, the core may have a step-type refractive index profile.

The core may have a graded-type refractive index profile.

The core, the inner cladding, the outer cladding and the at least one pair of stress-applying portions may be composed of $SiO_2$ doped with $GeO_2$, $SiO_2$ doped with F, $SiO_2$ and $SiO_2$ doped with $GeO_2$ and $B_2O_3$, respectively.

The core, the inner cladding, the outer cladding and the at least one pair of stress-applying portions may be composed of $SiO_2$ doped with $GeO_2$, $SiO_2$ doped with F, $SiO_2$ and $SiO_2$ doped with $Al_2O_3$ and $B_2O_3$, respectively.

The propagation velocity of the acoustic wave in the core may be not less than the propagation velocity in both the inner cladding and the stress-applying portions.

The core may comprise a center core and a side core having a refractive index lower than that of the center core and higher than that of the inner cladding.

The center core may have a step-type refractive index profile.

The center core may have a graded-type refraction index profile.

The side core may have a step-type refractive index profile.

The side core may have a graded-type refraction index profile.

The optial fiber may be made by drawing a preform having a core part, an inner cladding part surrounding the core part, cuter cladding part surrounding the inner cladding part, and at least one pair of stress-applying portion parts each of Which partially extend into both the inner and outer cladding parts and which are symmetrical about the axis of the core part, the thermal expansion coefficient of the at least one pair of stress-applying portion parts is higher than those of the inner and cuter cladding parts and refractive index of the at least one stress-applying portion parts is lower than that of the core parts and higher than that of the inner cladding part.

The above and other objects, effects, features and advantages of the present invention will become more apparent from the following description of embodiments thereof taken in conjunction with the accompanying drawings.

DETAILED DESCRIPTION OF PREFERRED EMBODIMENTS

According to the present invention, when the direction in which stresses are imparted is the x-direction, the refractive indices for the x-polarization are $n_{cx}$, $n_{1x}$, $n_{2x}$ and $n_{3x}$ of the core, the inner cladding, the outer cladding and the stress-applying portions, respectively, while the refractive indices for the y-polarization of the core, the inner cladding, the outer cladding and the stress-applying portions are represented by $n_{cy}$, $n_{1y}$, $y_{2y}$ and $y_{3y}$, respectively. In this case, when the core becomes a waveguide for the x-polarization, the following relaionships must be satisfied:

$$n_{1x} < n_{3x} < n_{cx}, \text{ and}$$

$$n_{3x} \leq n_{2x}.$$

In order to induce a geometrical birefringence, a preform for stress-applying portions having a high refractive index must be used and also the relationship $n_{1x} < n_{3x}$ must be satisfied. In this case, in order to prevent the stress-applying portions from becoming the waveguides, $n_{3x} \leq n_{2x}$ must be satisfied. For the y-polarization, the refractive index of the core $n_{cy}$ may be higher or lower than $n_{3y}$. When $n_{cy}$ is lower than $n_{3y}$, the core will never act as the waveguide for the y-polarization in any cases, but when $n_{cy}$ is higher than $n_{3c}$, a single-polarization optical fiber can be obtained when a suitable wavelength is selected. It follows, therefore, that it suffices to satisfy the relationships of $n_{1y} < n_{3y}$ and $n_{3y} \leq n_{2y}$. On the other hand, from the standpoint of stresses, when the thermal expansion coefficient of the stress-applying portions is higher than those of the inner and outer claddings, the stress-induced birefringence can be induced. In order that the geometrical birefringence and the stress-induced birefringence may be added together, the stress-applying portions must have a high refractive index and a high thermal expansion coefficient as described above. In this case, the outer cladding must be spaced apart from the core by a suitable distance so that the outer cladding does not adversely affect the transmission characteristics of the core. The single-polarization optical fibers in accordance with the present invention can have a high birefringence due to the additive effect of the refractive index of the stress-applying portions and stresses so that the single-polarization wavelength band can be widened.

Figure 1:
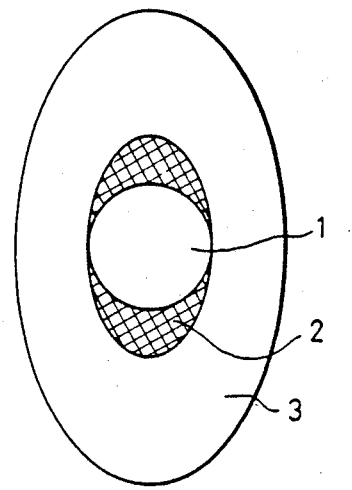
FIG. 1 is a sectional view showing a conventional single-polarization optical fiber.
Figure 2:
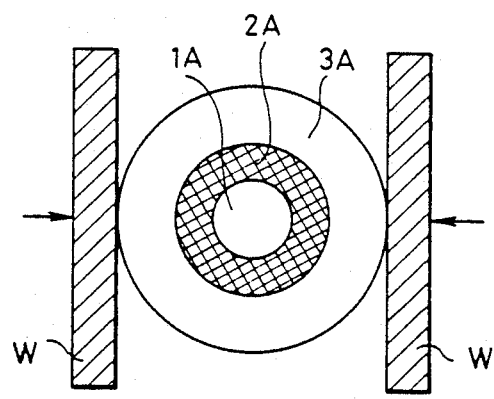
FIG. 2 is a sectional view showing a fabrication method of the optical fiber shown in FIG. 1.
Figure 3A:
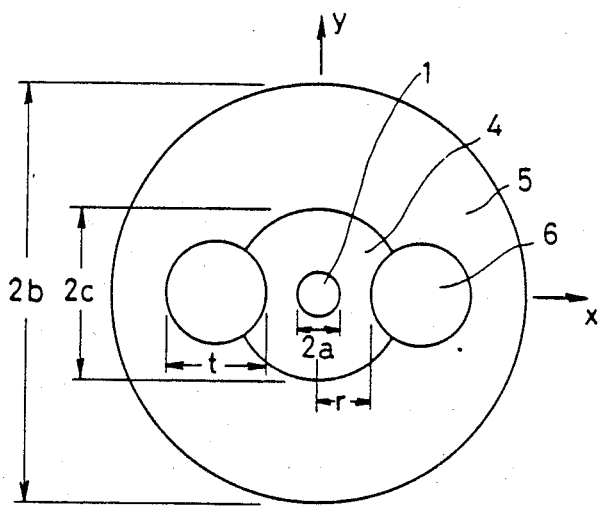
FIG. 3A is a sectional view showing another conventional single-polarization optical fiber.
Figure 3B:
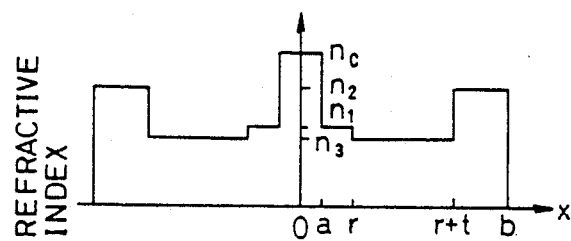
FIGS. 3B and 3C are diagrams illustrating a refractive index profile in the x- and y-directions of the optical fiber shown in FIG. 3A.
Figure 3C:
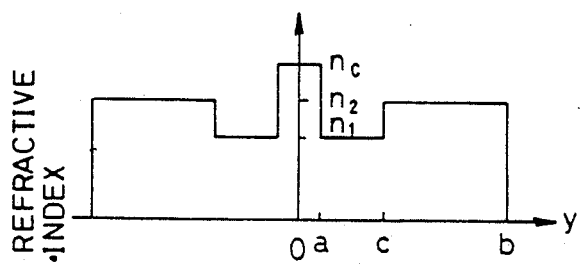
Figure 4A:
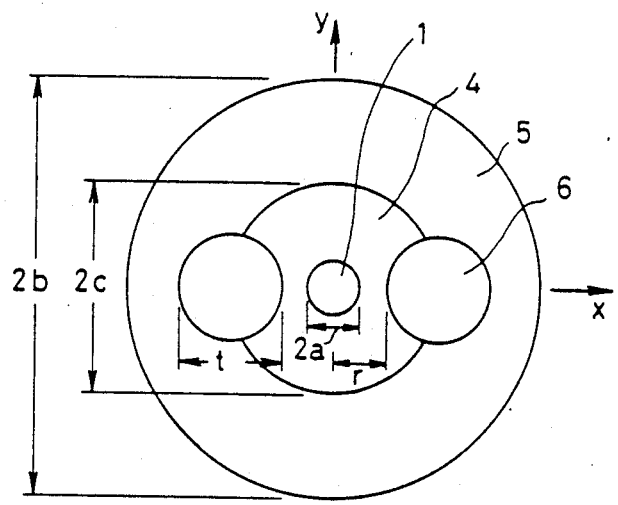
FIG. 4A is a sectional view showing an embodiment of the single-polarization optical fiber according to the present invention.
Figure 4B:
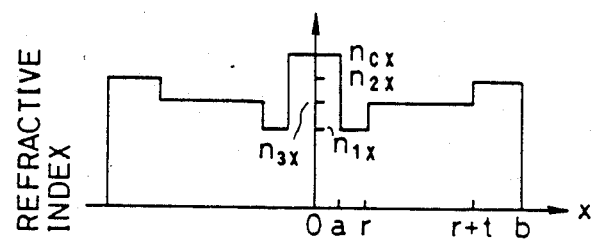
FIG. 4B and 4C are diagrams illustrating a refractive index profile of the x-polarization in the x-and y-directions of the optical fiber shown in FIG. 4A, respectively.
Figure 4C:
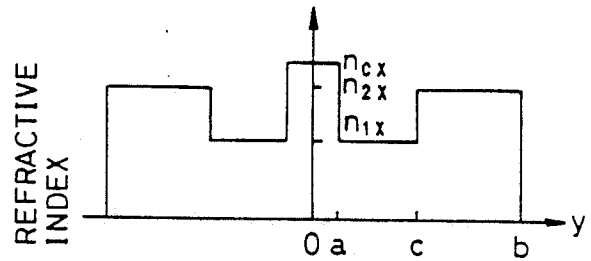

FIGS. 4A-4C illustrate in cross section a first embodiment of a single-polarization optical fiber in accordance with the present invention and its refractive index profile.

That is, FIG. 4A illustrates a cross sectional view of the single-polarization optical fiber while FIGS. 4B and 4C show the refractive index profiles in the x- and y-directions, respectively, of the optical fiber shown in FIG. 4A. As shown in FIG. 4A, the first embodiment of the present invention comprises a core 1 (2a in diameter and having a refractive index $n_{cx}$ for x-polarization), an inner cladding 4 (2c in diameter having a refractive index $n_{1x}$ for x-polarization) surrounding the core 1, an outer cladding 5 (2b in diameter and having a refractive index $n_{2x}$ for x-polarization) surrounding the inner cladding 4 and two stress-applying portions 6 (t in diameter each of which is spaced apart from the center of the core 1 by r and which have a refractive index $n_{3x}$ for x-polarization) which are partially extended into both the inner and outer claddings 4 and 5 and are symmetrical with respect to the axis of the core 1. When each refractive index for the y-polarization of the core, inner cladding, outer cladding and stress-applying portions is represented by $n_{cy}$, $n_{1y}$, $n_{2y}$ and $n_{3y}$, respectively the refractive index profile for y-polarization is the same as that shown in FIGS. 4B and 4C. In this case, the refractive indices satisfy the following relationships:

for x-polarization
$n_{1x} < n_{3x} \leq n_{cx}$, and
$n_{3x} \leq n_{2x}$,
for y-polarization
$n_{1y} < n_{3y}$, and
$n_{3y} \leq n_{2y}$.

In general, two polarizations (x- and y-polarization) can propagate through the optical fiber shown in FIG. 4A and in order to suppress one of the two polarizations (y-polarization in this embodiment), a high birefringence is required. According to the present invention, the thermal expansion coefficient of the stress-applying portions 6 of the single-polarization optical fiber is selected higher than those of the inner and outer claddings 4 and 5 so that at temperatures higher than 900° C., at which the preform of the optical fiber or the optical fiber itself is viscously fluidized, the stress becomes zero and when the viscously fluidizable preform or fiber is drawn into an optical fiber which in turn is maintained at room temperature, the stresses still remain since the stress-applying portions 6 tend to shrink more than the other portions. Due to the difference between a temperature at which the stress is zero, about 900° C. and room temperature, and because of the thermal expansion coefficients of the stress-applying portions, the inner cladding and the outer cladding, stresses are induced in the core and the portion adjacent thereto. The stress-applying portions 6 impart the tensile stresses in the x-direction to the core and the portion adjacent thereto. Because of the anisotropy of the stresses imparted to the core and the portion adjacent thereto, the birefringence is induced and this birefringence is called stress-induced birefringence $B_s$. In order to increase $B_s$, it is required that the difference in thermal expansion coefficient between the inner and outer claddings must be increased or the difference between a temperature at which the stress is zero and room temperature must be increased. It is also effective to locate the stress-applying portions as close as possible to the core. In the optical fiber in accordance with the present invention, the refractive index profile in the x- and y-directions are different and therefore the optical fiber has anisotropy of the refractive index profile. That is, for the x-polarization, the refractive indices of the inner cladding and the stress-applying portions, the latter being higher than the former, are distributed in the x-direction, which is the direction of the electrical field vector of the x-polarization. When viewed from the core in the peripheral direction only the refractive index of the inner cladding is distributed in the y-direction. While, for the y-polarization, when viewed from the core in the peripheral direction the refractive index of the inner cladding is distributed in the y-direction of the direction of the electrical field vector of the y-polarization. Hence, the refractive index of the x-polarization differs from that of the y-polarization. Because of such anisotropy of refractive index distributions, the birefringence is induced and this birefringence is called the geometrical birefringence $B_g$. In order to increase $B_g$, the stress-applying portions must be located as close as possible with respect to the core. Alternatively, $\Delta_p^+$ and $\Delta_p^-$, described hereinafter, must be increased.

In the case of the optical fiber in accordance with the present invention, the stress-induced birefringence $B_s$ and the geometrical birefringence $B_g$ are combined so that the total birefringence $B_t$ becomes the sum of $B_s$ and $B_g$.

The propagation conditions in the optical fiber are determined by the normalized frequency v; that is, $$v = 2\pi a \sqrt{n_{ci}^2 - n_{1i}^2}/\lambda \ (i = x, y)$$

where $\lambda$ is the wavelength of light used and i is x for the x-polarization and y for the y-polarization. Furthermore, with respect to the propagation constant $\beta$ in the axial direction of the optical fiber and the wave number k ($=2\pi/\lambda$), $n_{nor}$ represented by the following equation has a value between 0 and 1 and represents the normalized birefringence of the core. When $n_{nor}$ is 0, the propagation of the mode is suppressed while when $n_{nor}$ is 1, the mode is enclosed within the core.

$$n_{nor} = (\beta^2 - k^2 n_{3i}^2)/k^2(n_{ci}^2 - n_{3i}^2)(i=x,y)$$

Figure 5:
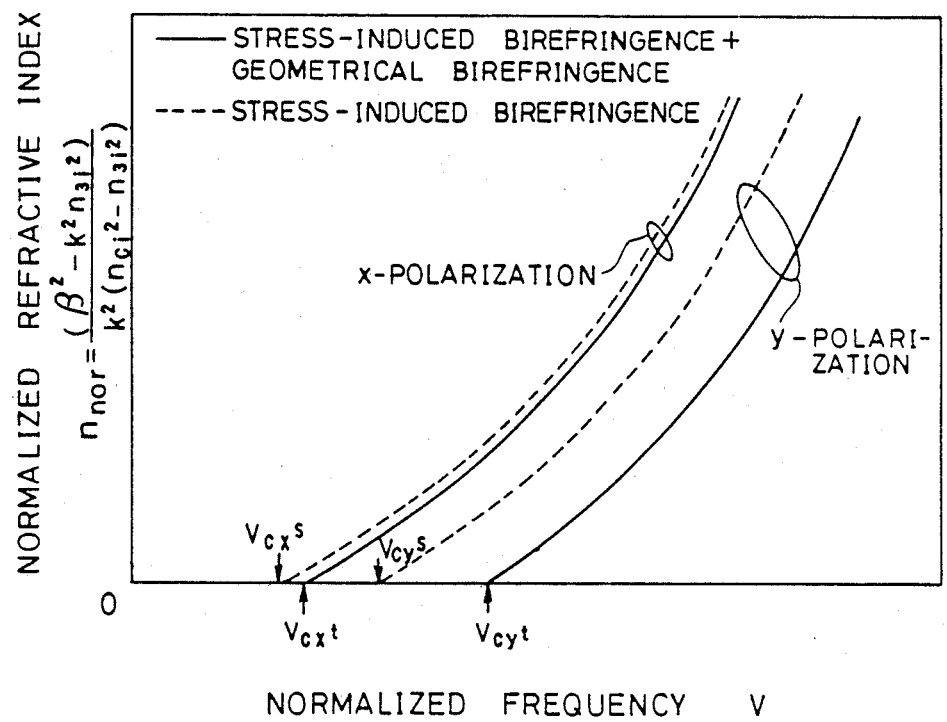
FIG. 5 shows a relationship between a normalized refractive index and a normalized frequency.

FIG. 5 illustrates the difference between the fundamental modes, $HE_{11}^x$ mode and $HE_{11}^y$ mode, of the single-polarization optical fiber in accordance with the present invention in terms of the relationship between the above described $n_{nor}$ in the vicinity of 0 and v. The solid line indicates the characteristic attained when the stress-induced birefringence and the geometrical birefringence are combined, which is one of the novel features of the present invention. The dotted line indicates the characteristic only when the stress-induced birefringence is taken into consideration. At the points of both lines at which $n_{nor}$ becomes zero, $\beta/k$ becomes equal to the refractive index $n_3$ of the stress-applying portions so that the light cannot be effectively confined within the core and therefore the transmission loss is increased. As a result that mode is not propagated. The value of v at which $n_{nor}$ becomes zero is defined as the normalized cutoff frequency $v_c$ and the corresponding wavelength is defined as the cutoff wavelength $\lambda_c$. Only when the stress-induced birefringence is taken into consideration, the normalized cutoff frequencies of x- and y-polarization are $v_{cx}^s$ and $v_{cy}^s$, respectively. When v is set at a value in this interval, only the x-polarization is propagated. The intersections $v_{cx}^t$ and $v_{cy}^t$ between the curve representative of the combination of the stress-induced birefringence and the geometrical birefringence and the abscissa indicate the normalized cutoff frequencies of the single-polarization optical fiber in accordance with the present invention. When the normalized cutoff frequency v is set at a value between them, only x-polarization propagates. It is noted that compared with the single-polarization band, from $v_{cx}^s$ to $v_{cy}^s$, only due to the stress-induced birefringence, the single-polarization band, from $v_{cx}^t$ to $v_{cy}^t$, attained by the combination of the stress-induced birefringence and the geometrical birefringence is wider.

Figure 6:
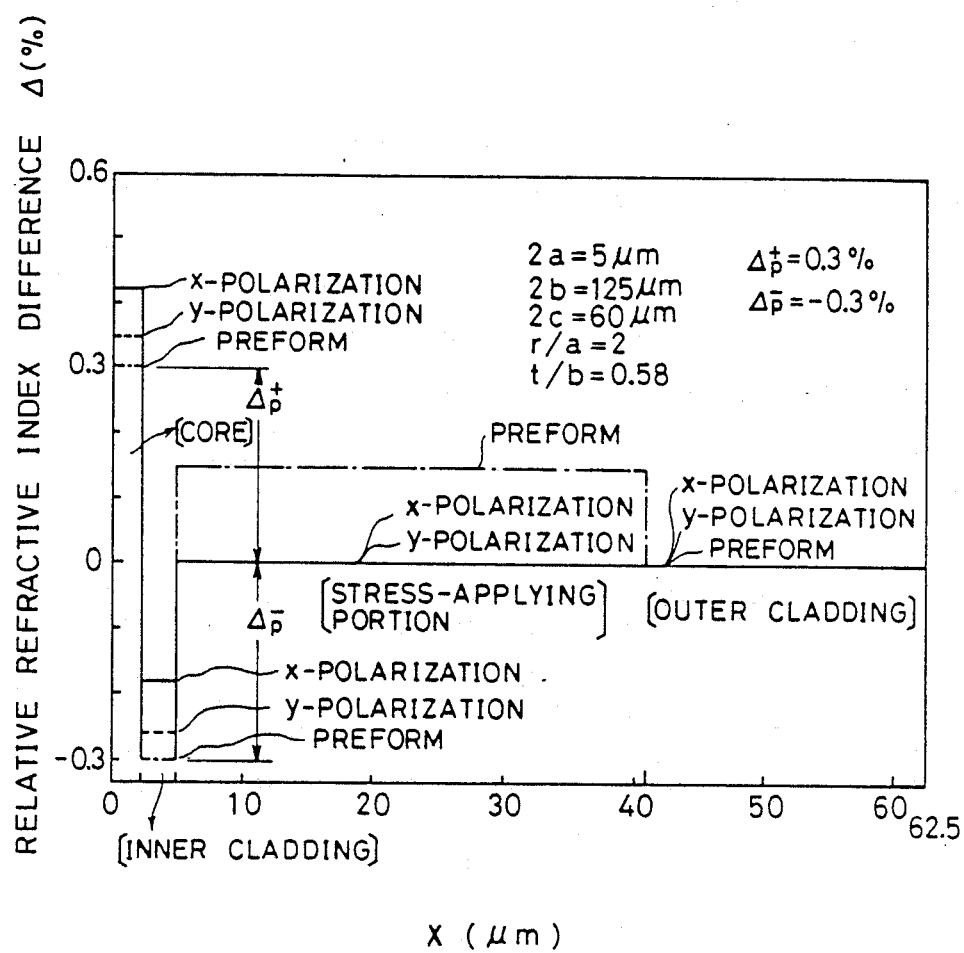
FIG. 6 is a diagram illustrating relative refractive index difference profiles of the x- and y-polarization in the x-direction.

FIG. 6 illustrates a result obtained by the theoretical analysis of the refractive index profile for the x- and y-polarization of an optical fiber according to the present invention. In FIG. 6, the ordinate indicates the relative refractive index differences with respect to the refractive index of the outer cladding, 1.458, while the abscissa indicates the distance in x-direction from the center of the fiber. In this case, 2a=5 $\mu$m, 2b=125 $\mu$m, 2c=60 $\mu$m, t/b=0.58 (t=36 $\mu$m) and r/a=2. In FIG. 6, the solid line indicates the relative refractive index difference for x-polarization; the dotted line the relative refractive index difference for y-polarization; and the dot and dashed line the refractive index distribution when no stress effect exists; that is, of the preform. In the form of a preform, the refractive index of the core is 1.462; the refractive index of the inner cladding is 1.454, the refractive index of the outer cladding is 1.458 and the refractive index of the stress-applying portions is 1.46. It is noted that after the optical fiber has been drawn, the stresses remain in the optical fiber so that the relative refractive index difference of the stress-applying portions drops from 0.14% to 0% and the refractive index of the stress-applying portions becomes equal to that of the outer cladding.

In the form of a preform, the relative refractive index differences of the core and the inner cladding for the stress-applying portions are defined as follows, respectively:

$$\Delta_p^+ = (n_{cp}^2 - n_{3s}^2)/2n_{cp}^2 \text{ and}$$

$$\Delta_p^- = (n_{1p}^2 - n_{3s}^2)/2n_{1p}^2$$

where $n_{cp}$ and $n_{1p}$ are the refractive indices, respectively, of the core and the inner cladding while $n_{3s}$ is the refractive index of the stress-applying portions after the optical fiber drawing. $n_{3s}$ is almost equal for both x- and y-polarization and is 1.458 in this case. According to the first embodiment, in the form of a preform $\Delta_p^+ = 0.3\%$ and $\Delta_p^- = -0.3\%$ for both x- and y-polarization, respectively, they change after the optical fiber drawing in such a way that the relative refractive index differences of the core for x- and y-polarization become 0.42% and 0.35%, respectively, and the relative refractive index differences of the inner cladding become $-0.18\%$ and $-25\%$, respectively, for x- and y-polarization. As a result, the refractive index for x-polarization is different from that for y-polarization. The stresses induced in the optical fiber in accordance with the first embodiment ca be computed by the finite element method disclosed in "Stress Analysis of Optical Fibers by a Finite Element Method", K. Okamoto et al, IEEE Journal of Quantum Electronics, Vol. QE-17, No. 10, pp.2123-2129, 1981). In the case of the abovementioned computation, the thermal expansion coefficients are $3.5 \times 10^{-6}$ (1/°C.), $0.6 \times 10^{-6} \times (1/°C.)$ and $0.54 \times 10^{-6}(1/°C.)$ for the stress-applying portions, the inner cladding and the outer cladding, respectively, and the temperature difference is 900° C. By using the value of the stress thus obtained, the refractive indices for x- and y-polarization, respectively, due to the photoelastic effect are obtained by the method disclosed in "Single-polarization operation in highly birefringent optical fibers", K. Okamoto, Applied Optics, Vol. 23, No. 15, pp. 2638-2642, 1984. The solid line indicates the refractive index profile for x-polarization while the dotted line, the refractive index profile for y-polarization. The refractive indices of the core and of the portion adjacent to the core of the cladding for x- and y-polarization are different due to the anisotropy of stresses, but the degree of anisotropy of the stresses in the stress-applying portions is low so that the refractive indices for x- and y-polarization are almost equal to each other. In the first embodiment, when the electromagetic field distribution is taken into consideration, the stress-induced birefringence $B_s$ becomes $8.5 \times 10^{-4}$.

Next, the geometrical birefringence is obtained. It can be obtained by obtaining the electromagnetic field distribution in the optical fiber by using the refractive index when no stress is applied. The geometrical birefringence can be expressed by $$(\beta_x-\beta_y)/k$$

where $\beta_x$ is the propagation constant for x-polarization of the fundamental mode ($HE_{11}$ mode) of the optical fiber, and $\beta_y$ is the propagation constant for y-polarization. $\beta_x$ and $\beta_y$ can be computed by the point matching method disclosed in "Modal Analysis of Homogeneous Optical Fibers with Deformed Boundaries", E. Yamashita et al., IEEE Trans. Microwave Theory and Techniques, Vol. MTT-27, No. 4, pp.352–356, 1979. The geometrical birefringence $B_g$ of the optical fiber in accordance with the first embodiment becomes $1.5 \times 10^{-4}$. It follows, therefore, that the total birefringence $B_t$ becomes the sum of the stress-induced birefringence $B_s = 8.5 \times 10^{-4}$ and the geometrical birefringence $B_g = 1.5 \times 10^{-4}$, that is $1.0 \times 10^{-3}$.

Figure 7:
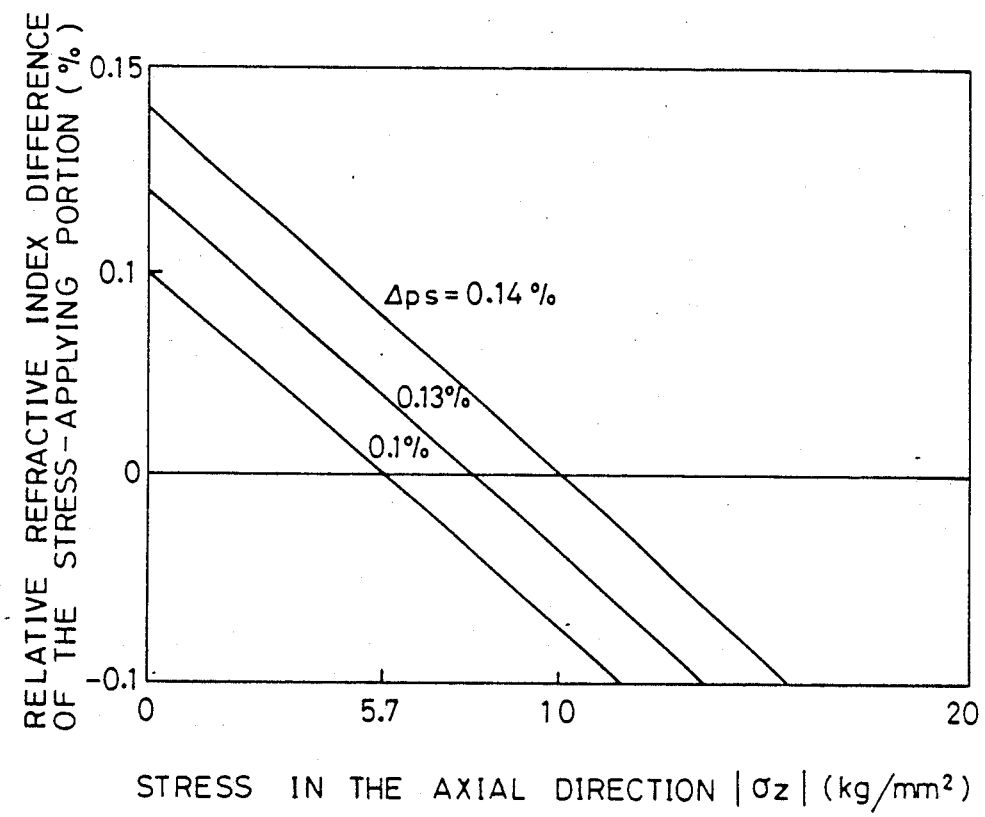
FIG. 7 shows a relationship between a relative refractive index difference of a stress-applying portion and a stress in the axial direction of an optical fiber.

FIG. 7 illustrates the relationship between the relative refractive index difference of the stress-applying portions and the stress $|\sigma_z|$ in the axial direction of each stress-applying portion. The relative refractive index difference of the stress-applying portions based on the reference which is the refractive index $n_{2x} = n_{2y} = 1.458$ of the outer cladding is plotted along the ordinate while the stress $|\sigma_z|$ in the axial direction of each stress-applying portion, along the abscissa. In the form of the preform, the relative refractive index differences $\Delta_{ps}$ of the substances of the stress-applying portions are 0.1%, 0.12% and 0.14%, respectively. The diameter of each stress-applying portions is 36 μm after the optical fiber drawing. The higher the stress in the axial direction, the smaller the value of the relative refractive index difference of the stress-applying portions becomes. In the case of FIG. 6, $\Delta_{ps} = 0.14\%$. After the optical fiber drawing, $|\sigma_z|$ becomes 10 kg./mm². Under these conditions, the relative refractive index difference of the stress-applying portions becomes 0% and the refractive index of the outer cladding becomes equal to that of the stress-applying portions so that the stress-applying portions do not function as the waveguides. In general, when the relative refractive index difference of the stress-applying portion substrate is so selected that the relative refractive index difference based on the reference which is the refractive index of the outer cladding becomes zero or negative, the stress-applying portions will never function as the waveguides.

In case of the design of the optical fiber according to the first embodiment, first the refractive index of the outer cladding in the form of a preform must be determined. Next after the optical fiber drawing, the refractive indices for x- and y-polarization of the stress-applying portion preform are so selected that the relationships $n_{3x} \leq n_{2x}$ and $n_{3y} \leq n_{2y}$ can be satisfied. Finally, the relative index differences of the core in the preform are so selected that $\Delta_p^+ > 0$ and $\Delta_p^- < 0$.

One of the parameters which determines the cutoff wavelength of the single-polarization optical fiber is the structure or construction parameter which includes $2a$ and $r/a$ and another parameters are a refractive index parameter $\Delta_p^+$ and $\Delta_p^-$.

Figure 8:
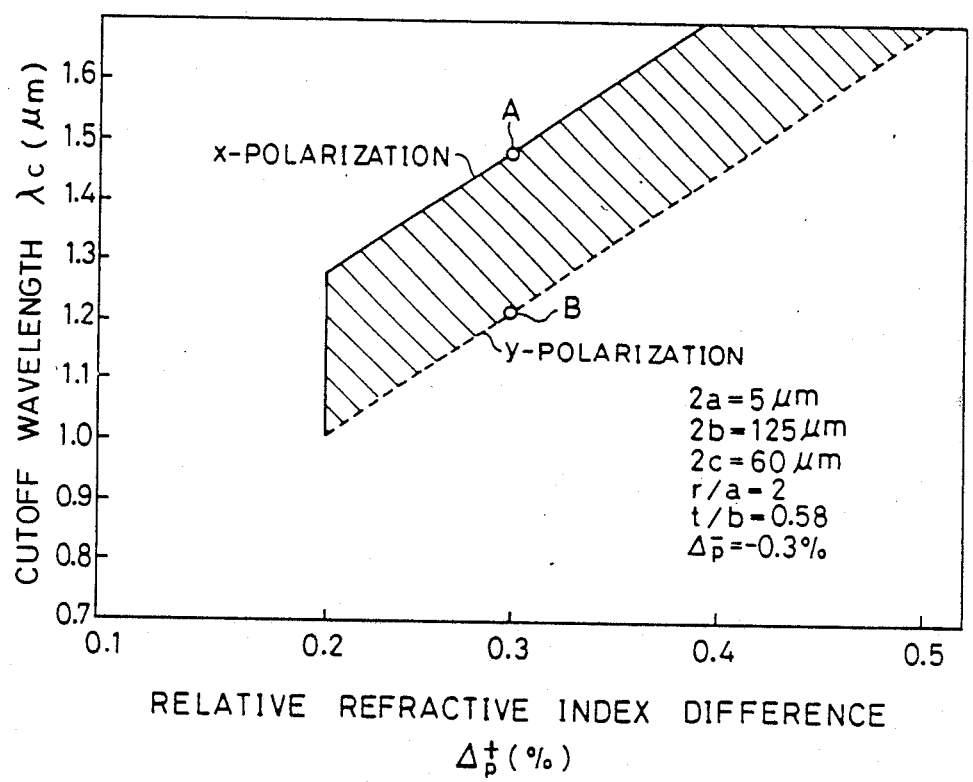
FIG. 8 shows a relationship between a cutoff wavelength and a relative refractive index difference $\Delta_P^+$.

FIGS. 8–12 illustrate the relationships between these parameters and the cutoff wavelengths for x- and y-polarization. FIG. 8 illustrates the relationships between $\Delta_p^+$ and the cutoff wavelengths of x- and y-polarization when $2a = 5$ μm, $2b = 125$ μm, $2c = 60$ μm, $t/b = 0.58$ $r/a = 2$ and $\Delta_p^- = -0.3\%$. It is assumed that the thermal expansion coefficients of the component parts and the temperature difference be equal to those in FIG. 6. The cutoff wavelength for x-polarization is obtained by utilizing the refractive index distribution for x-polarization when stresses are imparted. In like manner, the cutoff wavelength for y-polarization is obtained by utilizing the refractive index distribution for y-polarization. In FIG. 8, the solid line indicates the cutoff wavelength for x-polarization while the dotted line, the cutoff wavelength for y-polarization. For instance, it is noted from FIG. 8 that at $\Delta_p^+ = 0.3\%$, the cutoff wavelengths for x- and y-polarization are 1.48 μm and 1.2 μm, respectively. In the wavelength band between them, y-polarization is cutoff so that the optical fiber capable of transmitting or propagating only x-polarization can be realized. In FIG. 8, the hatched region is the single-polarization wavelength band. In general, the higher $\Delta_p^+$, the longer the cutoff wavelength becomes. In FIG. 8, the points A and B correspond to $\Delta_p^+ = 0.3\%$; that is, they indicate the values computed under the same condition as that in FIG. 6.

Figure 9:
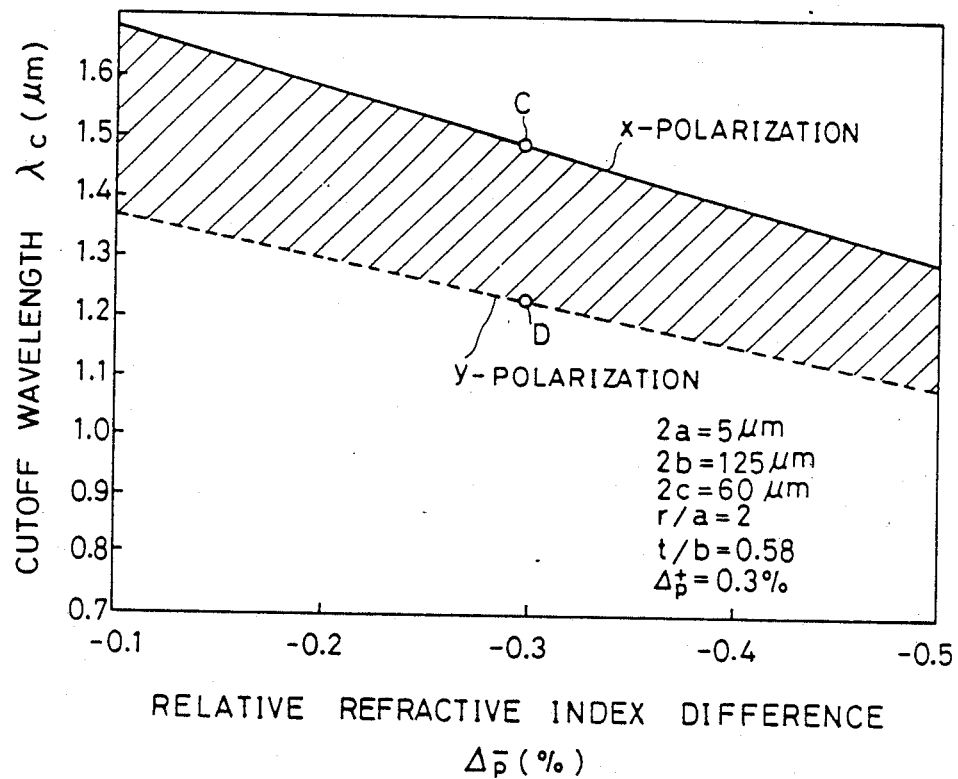
FIG. 9 shows a relationship between a cutoff wavelength and a relative refractive index difference $\Delta_P^-$.

FIG. 9 illustrates the relationship between $\Delta_p^-$ and the cutoff wavelength when $\Delta_p^+ = 0.3\%$. Other parameters such as the geometrical size, the thermal expansion coefficients and the temperature difference are the same as those of FIG. 6. The higher $|\Delta_p^-|$, the shorter the cutoff wavelengths for x- and y-polarization become as indicated by the solid line and the dotted line, respectively, but the variation of the single-polarization wavelength band indicated by the hatched region is less. For instance, when $\Delta_p^- = -0.2\%$, the cutoff wavelengths for x- and y-polarization are 1.58 μm and 1.3 μm, respectively, but when $\Delta_p^-$ are changed to $-0.3\%$ which is the value at the points C and D, the cutoff wavelengths for x- and y-polarization becomes 1.48 μm and 1.2 μm, respectively.

Figure 10:
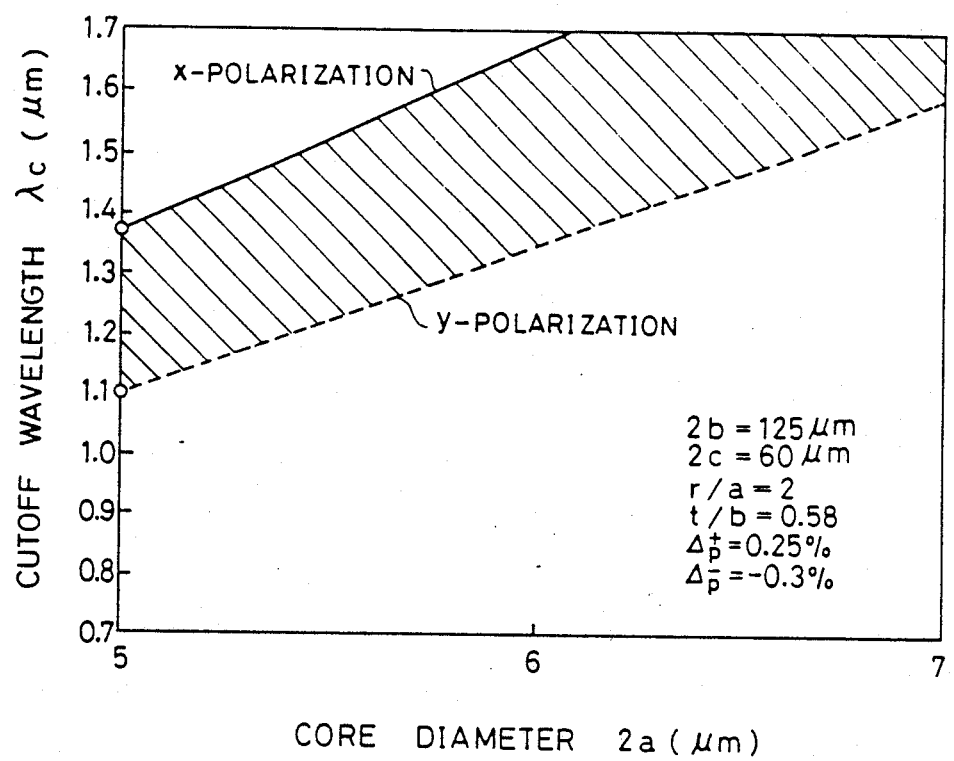
FIG. 10 shows a relationship between a cutoff wavelength and a core diameter.

FIG. 10 illustrates the relationship between the diameter of the core and the cutoff wavelengths for x- and y-polarization. In this case, $\Delta_p^+ = 0.25\%$ and $\Delta_p^- = 0.3\%$ and the other parameters are the same as in FIG. 8. When the diameter of the core is increased as described above, the cutoff wavelength becomes longer. For instance, the cutoff wavelengths of 1.37 μm and 1.1 μm for x- and y-polarization when $2a = 5$ μm change to 1.68 μm and 1.35 μm, respectively, when $2a = 6$ μm.

Figure 11:
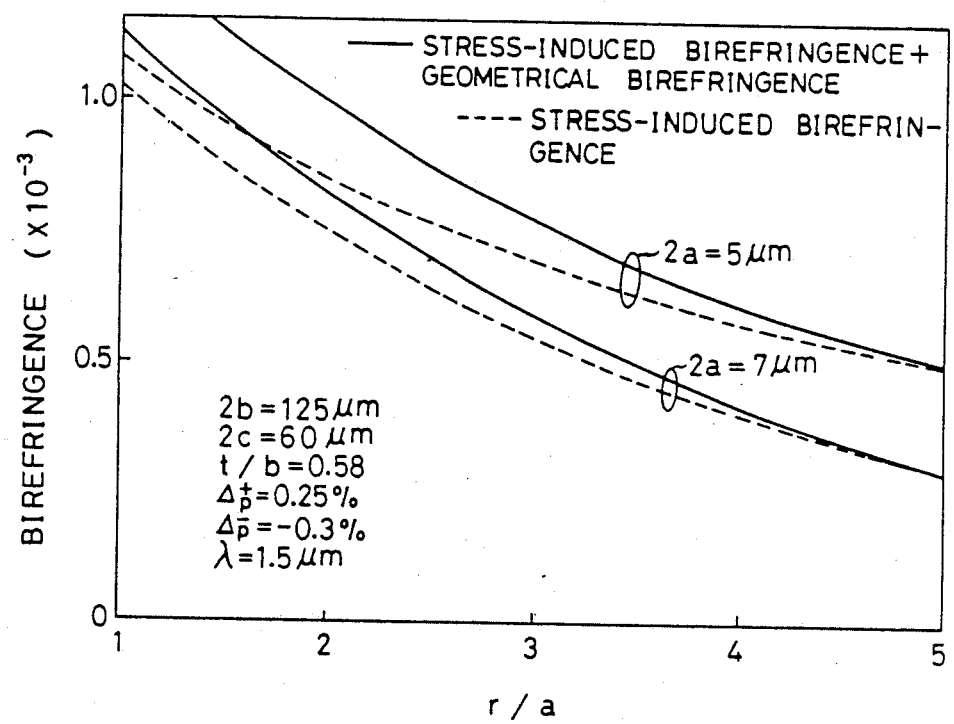
FIG. 11 shows a relationship between a birefringence and a position of stress-applying portions.

In order to increase the difference in cutoff wavelength between x- and y-polarization; that is, in order to enlarge the single-polarization band indicated by the hatched region, the total birefringence $B_t$ must have a high value. The closer the stress-applying portions are located adjacent to the core (that is, r/a approaches 1), the higher both the stress-induced birefringence $B_s$ and the geometrical birefringence $B_g$ become. Hence the total birefringence $B_t$ becomes higher. FIG. 11 illustrates the relationship between $B_t$ and r/a at the wavelength of 1.5 μm. In this case, $\Delta_p^+ = 0.25\%$ and $\Delta_p^- = 0.3\%$ and the other parameters such as the geometrical size, the thermal expansion coefficients and the temperature difference are the same as those in FIG. 6. The solid line indicates the case when both the stress-induced birefringence and the geometrical birefringence are taken into consideration, while the dotted line indicates the case when only the stress-induced birefringence is taken into consideration. For instance, when $r/2 = 2$ and $2a = 5$ μm, $B_t = 1.0 \times 10^{-3}$, but when $2a = 7$ μm, due to the distance r of each stress-applying portion from the axis of the core becomes longer; that is, the stress-applying portions are more spaced apart form the core, the value of $B_f$ is decreased to $8 \times 10^{-4}$. It is also noted here that when the stress-applying portions are more spaced apart from the core, the solid and dotted lines approach toward each other so that the effect of geometrical anisotropy is degraded.

Figure 12:
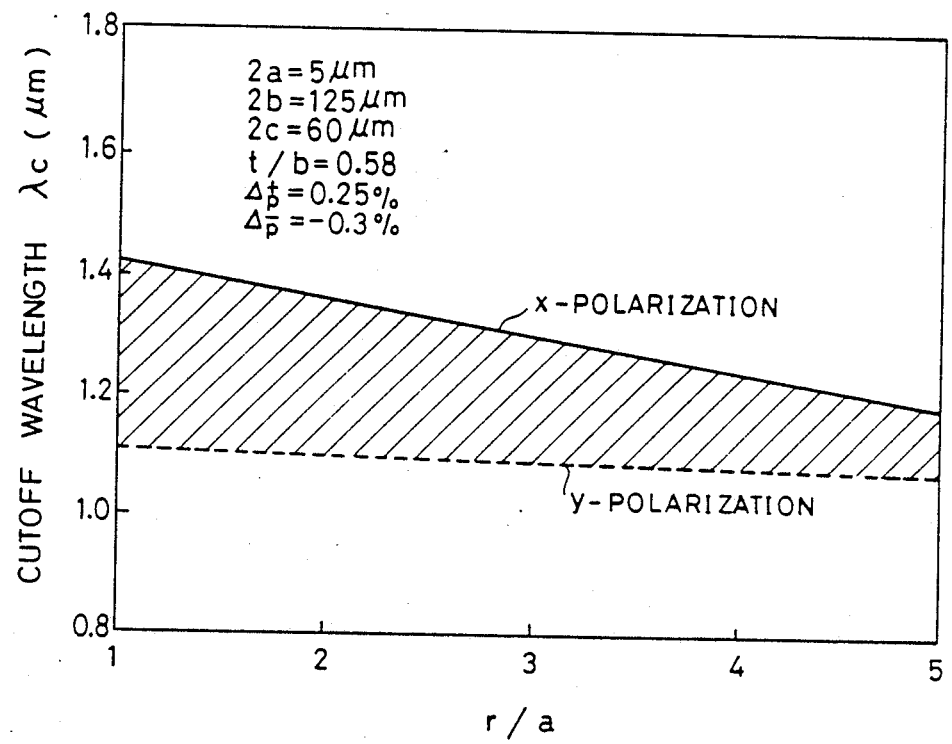
FIG. 12 shows a relationship between a cutoff wavelength and a position of stress-applying portions.

FIG. 12 illustrates the relationship between the normalized position r/a of each stress-applying portion and the cutoff wavelength. In this case, 2a=5 μm and the other parameters are the same as those in FIG. 11. The lower the ratio r/a, the longer the cutoff wavelengths for x- and y-polarization become and the single-polarization wavelength band indicated by the hatched region is enlarged.

For example, a single-polarization optical fiber in which only the x-polarization propagates at a wavelength of 1.3 μm can be realized by setting parameters at 2a=5 μm, 2b=125 μm, 2c=60 μm, t/b=0.58, $\Delta_p{}^+$=0.25% and $\Delta_p{}^-$=0.3%, and further, referring to FIG. 12, set a normalized position of the stress-applying portion r/a=2.

In the case of the so-called quarz-series optical fibers, it is well known to those skilled in the art that losses are low at the wavelengths of 1.3 μm and 1.5 μm. In order to realize the single-polarization optical fibers which are used in such wavelength bands, it suffices to determine the parameters such as sizes and thermal expansion coefficients of the component parts of the optical fiber with reference to FIGS. 8-10 and FIG. 12. In FIG. 12, the cutoff wavelength is below 1.5 μm, but it is apparent that when $\Delta_p{}^+$ is increased while $|\Delta_p{}^-|$ is decreased and/or the diameter 2a of the core is increased, the single-polarization optical fiber for the 1.5 μm band can be realized.

In the case of the optical fibers in accordance with the present invention, the diameter 2c of the inner cladding is so selected as not to adversely affect the transmission characteristic of the optical fiber. That is, the outer cladding must be sufficiently spaced apart from the core; one portion of each stress-applying portion exists in the outer cladding; and the refractive index of the outer cladding is selected higher than that of the stress-applying portions. The optical fiber having a step-like refractive index profile has been explained hereinbefore, however, the present invention can be applied to the optical fiber having a graded-type refractive index profile. The stress-applying portions may be in contact with the core. So far, in the first embodiment, only one pair of stress-applying portions have been described as being located on the x-axis, but it is also possible to divide the stress-applying portions and locate a plurality of pairs of stress-applying portions may be located adjacent to the x-axis. In this case, it becomes possible to impart the stresses in the x-axis direction. Following the underlying principle of the present invention described above, the single-polarization optical fibers can be realized.

An embodiment of the optical fiber actually fabricated in accordance with the present invention described above is illustrated.

Figure 13:
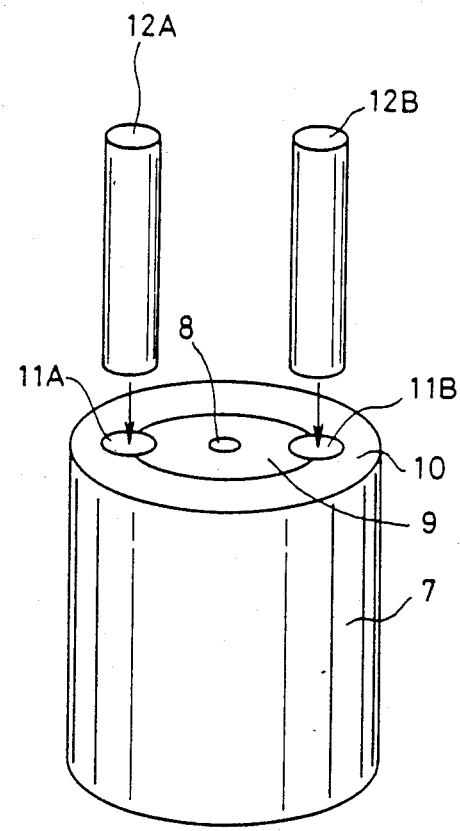
FIG. 13 is a perspective view showing a fabrication method of the single-polarization optical fiber shown in FIG. 4A.

FIG. 13 illustrates a method for fabricating a preform for the optical fiber in accordance with the present invention. A preform 7 comprises a core preform, 8, an inner cladding preform 9 and an outer cladding preform 10 all of which are disposed concentrically. By using an ultrasonic drill, holes 11A and 11B were drilled in such a way that they were symmetrical with respect to the axis of the preform 7 and then they were subjected to the grinding process with cerium particles and then the fire polishing process. Furthermore, the inner surfaces of the holes 11A and 11B were cleaned with hydrogen fluoride. Meanwhile, the surfaces of two preforms 12A and 12B of the stress-applying portions were polished in a manner substantially similar to that described above and were cleaned with hydrogen fluoride. The sizes of the component parts of the preform 7 with the above-described construction were as follows:

| | |
|---|---|
| diameter of core preform | 1.6 mm |
| diameter of inner cladding preform | 20 mm |
| diameter of outer cladding preform | 40 mm |
| diameter of each preform of stress-applying portion | 10 mm |
| diameter of holes | 10.2 mm |
| distance of each hole form the axis of the preform 7 | 1.6 mm |

Next, the compositions and relative refractive index differences of component parts of the preform 7 were as follows:

| | |
|---|---|
| core preform | $GeO_2.SiO_2$ |
| inner cladding preform | $F.SiO_2$ |
| outer cladding preform | $SiO_2$ |
| preform for stress-applying portion | $GeO_2.B_2O_3.SiO_2$ |
| $\Delta_p{}^+$ = 0.3% | |
| $\Delta_p{}^-$ = −0.3% | |
| $n_2$ = 1.458 | |
| $n_3$ = 1.460 | |

The preforms for stress-applying portions were $SiO_2$ glass doped with 18 mol % of $B_2O_3$ and 6 mol % of $GeO_2$ so that the thermal expansion coefficient of the stress-applying portions become higher than those of the inner and outer claddings.

The preforms 12A and 12B for the stress-applying portions were fitted into the hole 11A and 11B, respectively, and were made integral with the preform 10 by welding at 1500° C. under the reduced pressure in such a way that no gap exists between the performs 12A and 12B and the preform 7. Thereafter, the preform 7 was increased in temperature to 2000° C. and was drawn, thus the single-polarization optical fiber having the following specification was obtained.

| | |
|---|---|
| diameter of core | 2a = 5 μm |
| diameter of inner cladding | 2c = 62.5 μm |
| diameter of outer cladding | 2b = 125 μm |
| diameter of stress-applying portions | t = 31.3 μm (t/b = 0.5) |
| normalized positions of stress-applying portions | r/a = 2 |

Figure 14:
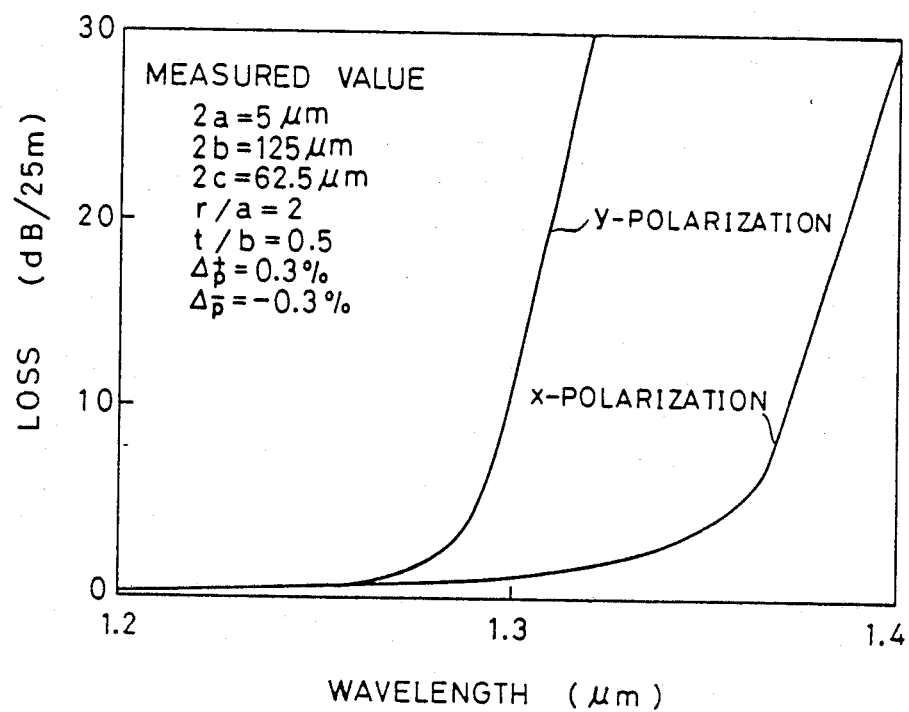
FIG. 14 is a characteristics curve graph showing relationships between loss of an x- and y-polarization and a wavelength in an embodiment of the present invention.
Figure 15:
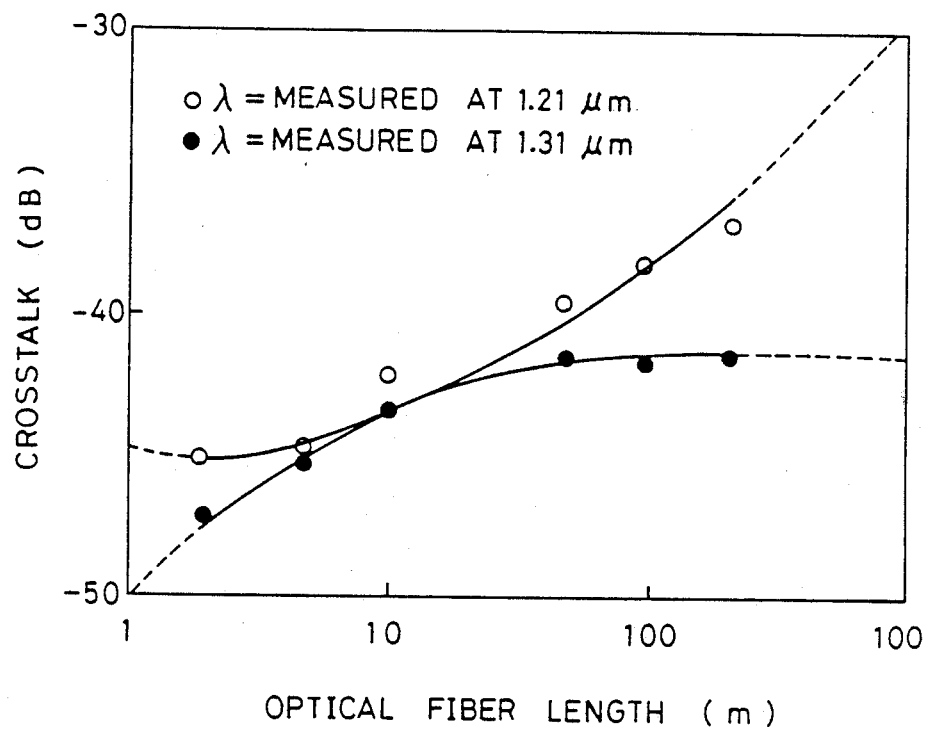
FIG. 15 is a characteristics curve graph showing a relationship between a crosstalk and an optical fiber length in an embodiment of the present invention.

The results of evaluation of the characteristics of the single-polarization fiber thus obtained are illustrated in FIGS. 14 and 15. FIG. 14 illustrates the losses when x- and y-polarization are guided into the straight optical fiber 25 m in length and the wavelength is varied. It is noted that the loss for y-polarization rapidly increases from wavelength of about 1.3 μm while the loss for x-polarization rapidly increases from about 1.37 μm. It follows, therefore, that when the optical fiber is used at a wavelength between the above-mentioned wavelengths, x-polarization propagates with less loss while the loss of y-polarization is so high that y-polarization is substantially suppressed, whereby the optical fiber becomes the single-polarization mode.

FIG. 15 illustrates the results of the measurements of the ratio in intensity between x- and y-polarization in terms of crosstalk when x-polarization is guided into the optical fiber and the optical fiber is sequentially cutoff, thereby varying the length of the optical fiber in order to evaluate the suppressed state of y-polarization described above. As is apparent from FIG. 15, the open dots indicate the results of the measurements at the wavelength of 1.21 μm at which both x-and y-polarization can propagate with less loss. At the above-mentioned wavelength of 1.21 μm, even when x-polarization guided into the optical fiber is slightly coupled with y-polarization, the latter propagates with less loss so that when the optical fiber is increased in length, y-polarization is added to x-polarization and therefore the crosstalk is increased with the increase in length of the optical fiber. Meanwhile the black dots indicate the results of the measurements at the wavelength of 1.31 μm at which y-polarization has a high loss (about 20 dB/25 m). The coupled y-polarization suffers a high loss so that the crosstalk will not increase with the increase in length of the optical fiber and the optical fiber longer than 100 m in length maintained crosstalk less than −40 dB. Thus, it has been confirmed that the optical fiber in accordance with the present invention has the single-polarization characteristic.

Next, a second preferred embodiment of the single-polarization optical fiber in accordance with the present invention will be described.

In the second embodiment, the core portion consists of $GeO_2.SiO_2$; the inner cladding, $F.SiO_2$; the cuter cladding, $SiO_2$; and the stress-applying portions, $Al_2O_3.B_2O_3.SiO_2$. The relative refractive index of the core with respect to the inner cladding is 0.3%; that of the inner cladding with respect to the cuter cladding is −0.3%. The stress-applying portions are composed of $SiO_2$ doped with 10 mol % of $Al_2O_3$ and 15 mol % of $B_2O_3$ so that its refractive index has same value as that of the cuter cladding after drawing for making the optical fiber. To obtain a single-polarization optical fiber in which only the x-polarization propagates at a wavelength of 1.55 μm, the parameters were set as follows; $2a=5$ μμm, $2b=200$ μm, $2c=100$ μm, $r/a=2$ and $t/b=0.6$. The birefringence $B_t$ of the obtained single-polarized optical fiber was $1.3\times10^{-3}$, and the propagation loss of the y- and x-polarization at a wavelength of 1.55 μm were 35 dB/km and 0.5 dB/km, respectively.

Further, the single-polarization optical fibers are attained by using $GeO_2.SiO_2$ for the core, $SiO_2$ for the inner cladding, $GeO_2.SiO_2$ for the outer cladding and $GeO_2.B_2O_3.SiO_2$ for the stress-applying portions or using $SiO_2$ for the core, $F.SiO_2$ for the inner cladding, $GeO_2.SiO_2$ for the cuter cladding and $GeO_2.B_2O_3.SiO_2$ for the stress-applying portions and setting the structural parameters and the refractive index differences $\Delta_p{}^+$ and $\Delta_p{}^-$ according to FIGS. 7–11.

In addition to the combinations of the materials of the core, the inner cladding, the cuter cladding and the stress-applying portions described in the first and second embodiments, a core material may be selected from the group consisting of $SiO_2$, $F.SiO_2$, $P_2O_5.SiO_2$, $GeO_2.SiO_2$, $GeO_2.P_2O_5.SiO_2$ and $Al_2O_3.SiO_2$, an inner cladding material may be selected from the group consisting of $SiO_2$, $F.SiO_2$ and $B_2O_3.SiO_2$, and an outer cladding material may be selected from the group consisting of $SiO_2$, $F.SiO_2.GeO_2.SiO_2$, $Al_2O_3.SiO_2$, $P_2O_5.SiO_2$, $GeO_2.Al_2O_3.SiO_2$, $P_2O_5.Al_2O_3.SiO_2$ and $GeO_2.P_2O_5.SiO_2$, and further a stress-applying portions material may be selected from the group consisting of $SiO_2$, $B_2O_3.SiO_2$, $GeO_2.SiO_2$, $Al_2O_3.SiO_2$, $GeO_2.P_2O_5.SiO_2$, $B_2O_3.Al_2O_3.SiO_2$, $P_2O_5.SiO_2$ and $GeO_2.B_2O_3.SiO_2$.

By selecting the refractive indices and thermial expansion coefficients of the core, the inner cladding, the outer cladding and the stress-applying portions in such a manner that mentioned before, the single-polarization optical fiber can be realized on the basis of the same underlying principle described above.

Figure 16A:
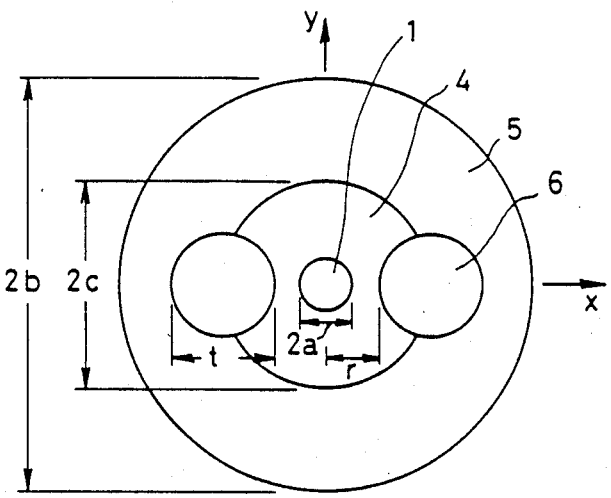
FIG. 16A is a sectional view showing another embodiment of the present invention.
Figure 16B:
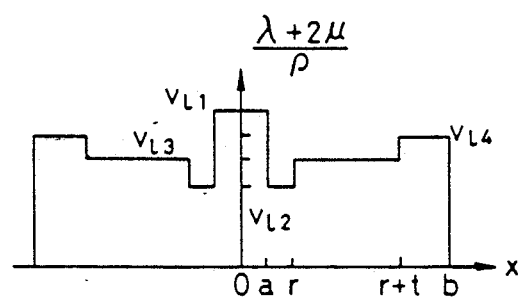
FIGS. 16B and 16C are profiles of a propagation velocity of a longitudinal acoustic wave in the x- and y-direction of the optical fiber shown in FIG. 16A, respectively.
Figure 16C:
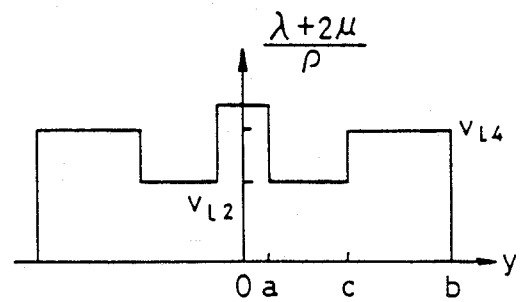

FIGS. 16A–16C illustrate the cross section of a third embodiment of the optical fiber in accordance with the present invention and the longitudinal acoustic wave velocity profile.

It is possible that the optical fiber becomes a medium for guiding not only light but also the acoustic waves and it is well known to those skilled in the art that Brillcuin scattering caused by the interaction between the light and acoustic waves is the noise source for the signal light transmitted through the optical fiber.

The third embodiment of the present invention is the single-polarization optical fiber in which the acoustic wave loss within the core is high for the acoustic wave which exists within the optical fiber or which is oscillated from the exterior and the efficiency of Bullouin scattering can be reduced to a minimum.

FIG. 16A illustrates the cross section of the optical fiber and FIGS. 16B and 16C illustrate the longitudinal acoustic wave velocity profile in the x- and y-directions, respectively.

The refractive indices $n_c$, $n_1$, $n_2$ and $n_3$ of the core, the inner cladding, the cuter cladding and the stress-applying portions, respectively, satisfy the following relations:

$$n_1 < n_c,$$

$$n_1 < n_3 < n_c \text{ and}$$

$$n_3 \leq n_2.$$

The refractive index profiles are the same as those shown in FIG. 4B and 4C.

The density of the core, that of the inner cladding, that of the cuter cladding and that of the stress-applying portions of the optical fiber are represented by $\rho 1$, $\rho 2$, $\rho 3$ and $\rho 4$, respectively, and Lame's constants are represented by $\mu 1$, $\mu 2$, $\mu 3$ and $\mu 4$ and $\lambda 1$, $\lambda 2$, $\lambda 3$ and $\lambda 4$. Then, the velocity $V_{li}$ of the longitudinal acoustic wave and the velocity $V_{si}$, where $i=1,2,3$ and 4 are expressed by the following equations:

$$V_{li} = \sqrt{(\lambda i^2 \mu i)/\rho^i}$$

and $$V_{si} = \sqrt{\mu^i/\rho^i}$$

According to the third embodiment, as shown in FIGS. 16B and 16C, the longitudinal acoustic waves $Vl_1$, $Vl_2$, $Vl_3$ and $Vl_4$ propagated through the core 1, the inner cladding 4, the cuter cladding 5 and the stress-applying portions 6 satisfy the following relation:

$$Vl_2 < Vl_3 < Vl_1$$

and $Vl_3 = Vl_4$ and within the inner cladding, the longitudinal acoustic wave distribution has anisotropy.

In general, when the phase-shift velocity V of the acoustic wave propagated through the core satisfies the relationship of $V_{si} < V < V_{sj}$, some modes of the transverse acoustic wave are propagated through the core while when $Vl_1 < V < Vl_3$, some modes of the longitudinal wave propagate.

On the other hand, when the condition $V_{si} \leq V_{sj}$ is satisfied, the propagation mode of the transverse acoustic wave does not exist within the core, but the transverse acoustic wave becomes the divergent wave into the inner cladding. In like manner, when $Vl_1 = Vl_3$, the longitudinal acoustic wave cannot propagate through the core. That is, loss of the propagation mode of the acoustic wave in the core is increased, so that Bullouin scattering light caused by the interaction between almost all light confined within the core and the above-mentioned acoustic wave can be suppressed.

In the case of $V_{s1} \simeq V_{s2}$, when the condition $V_{s1} \geq V_{s3}$ is set, the attenuation of the propagation mode of the transverse wave in the core and the inner cladding can be considerably increased. In like manner, in the case of $V_{l1} \simeq V_{l2}$, when the condition $V_{l1} \geq V_{l3}$ is set, the longitudinal acoustic wave in the core can suppressed.

The combination of the core, the inner cladding, the cuter cladding and the stress-applying portions capable of satisfying the single-polarization condition for light as well as the acoustic wave suppression condition is as follows.

For instance, when the core consists of $SiO_2 + GeO_2$ (3 mol %) while the inner cladding consists of $SiO_2 + B_2O_5$ (15 mol %), the refractive indices are $n_c = 1.462$ and $n_1 = 1.455$ so that the condition $n_c > n_2$ is satisfied. For the acoustic waves, $V_{s1} = 3.68$; $V_{s2} = 3.10$, $V_{l1} = 5.81$ and $V_{l2} = 5.16$ (unit: $10^5$ dyn cm/gm so that the conditions for the acoustic waves $V_{s1} \geq V_{s2}$ and $V_{l1} \geq V_{l2}$ are satisfied. When the stress-applying portions consist of $SiO_2 + B_2O_5$ (20 mol %) + $GeO_2$ (mol %) while the outer cladding consists of $SiO_2 + GeO_2$ (3 mol %), $n_2$ becomes almost equal to 1.461 and $n_3$ becomes almost equal to 1.462 so that the refractive index conditions are also satisfied.

Next will be described a single-polarization optical fiber, which is not susceptible to loss by bending when the fiber is assembled into a cable and polarization dispersion and a chromatic dispersion which are causes of deterioration in a transmission bandwidth can be made zero at a wavelength of approximately 1.5 μm at which optical fiber loss is minimized.

A condition of light propagating in an optical fiber is determined by before-mentioned normalized frequency V. It is known that in a step-index optical fiber the optical fiber is in single mode when $V < 2.4$ and a transmission bandwidth of a single-mode optical fiber is limited by chromatic dispersion. The chromatic dispersion is given by the sum of a material dispersion dependant on the fiber material and a waveguide dispersion (structure dispersion) caused by a refractive index profile of the fiber.

The material dispersion of silica optical fiber is positive in a longer wavelength region of a wavelength over 1.3 μm. On the other hand, the waveguide dispersion is negative in a so-called single mode region in the case of a step-type fiber. Consequently, it is clear that at a wavelength over 1.3 μm the chromatic dispersion given by the sum of these values can be made to be zero.

For making a chromatic dispersion of a single mode optical fiber zero at a wavelength of about 1.5 μm, an optical fiber which comprises a center core and a side core disposed on an outer side of the center core and having a refractive index lower than that of the center core is disclosed by U.S. Pat. No. 4,755,022.

In a single mode optical fiber which does not have birefringency, since propagation constants of orthogonally polarized $HE_{11}$ modes degenerate each other there are no dispersion between two polarized modes. However, in practice, birefringence is induced in above-mentioned zero dispersion single mode optical fiber due to slight elliptical deformation of the core or bending of the optical fiber. As a result, there exists a small difference between the propagation constant of polarized modes to cause a limited mode dispersion.

Following embodiment of the single-polarization optical fiber includes a double structured core disclosed in U.S. Pat. No. 4,755,022 for making both polarization and chromatic dispersion at a wavelength of about 1.5 μm.

Figure 17:
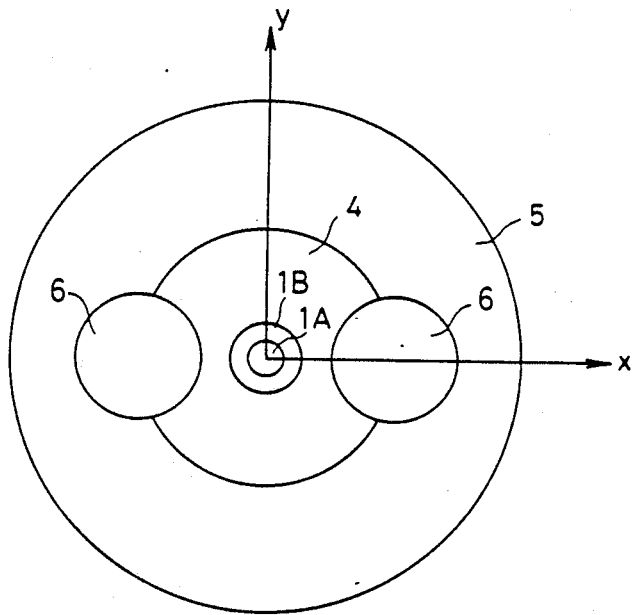
FIG. 17 is a sectional view of a further embodiment of the present invention.

FIG. 17 is a sectional view showing a zero dispersion single-polarization optical fiber. As shown in FIG. 17, the optical fiber of this embodiment has a side core 1B disposed on an cuter side of a center core 1A, an inner cladding 4 disposed on the outer side of the side core 4, an cuter cladding 5 disposed on the outer side of the inner cladding 4 and further stress-applying portions 6 partially extended into both inner and cuter claddings.

This zero dispersion single-polarization optical fiber has the same refractive index profiles of x- and y-polarization as that of the optical fiber shown in FIGS. 4A–4C except center core 1A and side core 1B.

Figure 18:
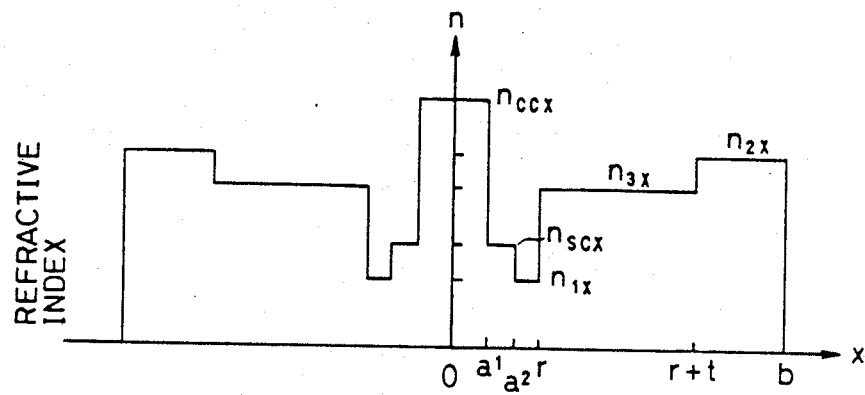
FIG. 18 is a diagram showing a refractive index profile of x-polarization in the x-direction of the optical fiber shown in FIG. 17.

FIG. 18 shows a refractive index profile of x-polarization of the optical fiber shown in FIG. 17. When the refractive indices of of x-polarization of the center core 1A, side core 1B, inner cladding 4, cuter cladding 5 and stress-applying portions 6 are $n_{ccx}$, $n_{scx}$, $n_{1x}$, $n_{2x}$ and $n_{3x}$, there exist relations $n_{1x} < n_{3x} < n_{ccx}$ and $n_{3x} \leq n_{2x}$, and further when relative refractive index difference between the center core 1A and inner clad 4 is $\Delta c$ ($\Delta c = n_{ccx}^2 - n_{1x}^2)/2n_{ccx}^2$) and between the side core 1B and inner cladding 4 is $\Delta s$ ($\Delta s = (n_{scx}^2 - n_{1x}^2)/2n_{scx}^2$) there exist relations $0.1 \leq \Delta c \leq 0.3$ and $\Delta c < 0.005$. That is, refractive index $n_{ccx}$ of the center core corresponds to the refractive index $n_{cx}$ of the core of the before-mentioned single-polarization optical fiber which is shown in FIGS. 4A–4C. The relations between refractive indices of y-polarization is the same as that of the before-mentioned single-polarization optical fiber, that is $n_{1y} < n_{3y}$ and $n_{3y} \leq n_{2y}$. An excess condition is not required for y-polarization which should be cutoff.

A zero dispersion and single-polarization optical fiber can be obtained by selecting the values of $\Delta s/\Delta c$ and $\Delta c$ on the basis of the method described in U.S. Pat. No. 4,755,022.

An optical fiber having step-like refractive index profile is shown in FIG. 18, however, the present invention can be applied to the optical fiber having a graded-type refractive index profile. Further, in the present invention, the refractive index profile of the center core 1A is basically not limited, and any profile is acceptable as long as there is a step-like difference between the maximum refractive indices of side core 1B, $n_{scx}$ and the center core 1A, $n_{ccx}$. Also, the refractive index profile of the side core 1B is basically not limited, and any profile is acceptable as long a there is a step-like difference between the refractive indices of center core 1A and side core 1B and between inner cladding 4 and side core 1B.

As mentioned above, in the single-polarization optical fiber according to the present invention, high birefringence is obtained due to the additive effect of the refractive index of the stress applying portion and stress-induced birefringence. Accordingly, the single-polarization wavelength band of the optical fiber according to the present invention can be broadened. Further, a single-polarization optical fiber having less Brillouin scattering can be obtained by selecting such materials for each portions that the propagation velocity of an acoustic wave in the core becomes higher than that of in the inner cladding and stress-applying portion. And further, a single-polarization optical fiber having zero dispersion at a wavelength of about 1.5 μm can be obtained by adopting a double-structured core composed of a center core and a low refractive index side core.

The invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A single-polarization optical fiber comprising:
a core;
an inner cladding surrounding said core;
an outer cladding surrounding said inner cladding; and
at least one pair of stress-applying portions each of which are extended into both said inner and outer claddings so as to induce a geometrical birefringence due to an anisotropy of a refractive index profile as well as a stress-induced birefringence due to an anisotropy of an induced stress and which are symmetrical about said core, the thermal expansion coefficient of said stress-applying portions being higher than those of said inner and outer claddings;
wherein when the direction in which said stress-applying portions impact stresses is designated by the x-direction and the direction perpendicular to said x-direction is designated by the y-direction, the following conditions are satisfied:

$n_{1x} < n_{3x} < n_{cx}$,
$n_{3x} \leq n_{2x}$,
$n_{1y} < n_{3y}$ and
$n_{3y} \leq n_{2y}$ where $n_{cx}$, $n_{1x}$, $n_{2x}$ and $n_{3x}$ are refractive indices for x-polarization of said core, said inner claddings, said outer cladding and said stress-applying portions, respectively, and $n_{cy}$ $n_{1y}$, $n_{2y}$ and $n_{3y}$ are refractive indices for y-polarization of said core, said inner cladding, said outer cladding and said stress-applying portions, respectively.

2. A single-polarization optical fiber as claimed in claim 1, wherein said core has a step-type refractive index profile.

3. A single-polarization optical fiber as claimed in claim 1, wherein said core has a graded-type refractive index profile.

4. A single-polarization optical fiber as claimed in claim 1, wherein said core, said inner cladding, said cuter cladding and said at least one pair of stress-applying portions are composed of $SiO_2$ doped with $GeO_2$, $SiO_2$ doped with F, $SiO_2$ and $SiO_2$ doped with $GeO_2$ and $B_2O_3$, respectively.

5. A single-polarization optical fiber as claimed in claim 1, wherein said core, said inner cladding, said cuter cladding and said at least one pair of stress-applying portions are composed of $SiO_2$ doped with $GeO_2$, $SiO_2$ doped with F, $SiO_2$ and $SiO_2$ doped with $Al_2O_3$ and $B_2O_3$, respectively.

6. A single-polarization optical fiber as claimed in claim 1, wherein the propagation velocity of the acoustic wave in said core is not less than the propagation velocity in both said inner cladding and said stress-applying portions.

7. A single-polarization optical fiber as claimed in claim 1, wherein said core comprises a center core and a side core having a refractive index lower than that of said center core and higher than that of said inner cladding.

8. A single-polarization optical fiber as claimed in claim 7, wherein said center core has a step-type refractive index profile.

9. A single-polarization optical fiber as claimed in claim 7, wherein said center core has a graded-type refraction index profile.

10. A single-polarization optical fiber as claimed in claim 7, wherein said side core has a step-type refractive index profile.

11. A single-polarization optical fiber as claimed in claim 7, wherein said side core has a graded-type refraction index profile.

12. A single-polarization optical fiber as claimed in claim 1, wherein said optical fiber is made by drawing a preform having a core part, an inner cladding part surrounding said core part, outer cladding part surrounding said inner cladding part, and at least one pair of stress-applying portion parts each of which are extended into both said inner and outer cladding parts and which are symmetrical about said core part, the thermal expansion coefficient of said at least one pair of stress-applying portion parts is higher than those of said inner and outer cladding parts and the refractive index of said at least one pair of stress-applying portion parts is lower than that of said core part and higher than that of said inner cladding part.

13. A single-polarization optical fiber as claimed in claim 1, wherein said inner cladding has a diameter sufficient to prevent influence of said outer cladding on the transmission characteristics of the x- and y-polarization of the fundamental mode.

* * * * *